United States Patent [19]

Tucker

[11] 3,893,336
[45] July 8, 1975

[54] METHOD AND APPARATUS FOR AUTOMATICALLY EVALUATING ACCURACY AND PATTERN DENSITY FOR A SHOTGUN

[75] Inventor: Henry G. Tucker, Norwalk, Conn.
[73] Assignee: Remington Arms Company, Inc., Bridgeport, Conn.
[22] Filed: Mar. 5, 1973
[21] Appl. No.: 337,881

[52] U.S. Cl. .................. 73/167; 33/1 L; 33/125 A
[51] Int. Cl. .............................................. F41c 31/04
[58] Field of Search ............ 73/167; 346/38; 33/1 L, 33/125 A; 178/DIG. 22, DIG. 38, DIG. 37, DIG. 36; 235/92 PC; 250/224, 222 PC, 569, 234

[56] References Cited
UNITED STATES PATENTS

| | | | |
|---|---|---|---|
| 1,226,762 | 5/1917 | Farnham | 73/167 |
| 2,378,545 | 6/1945 | Fraser | 73/167 |
| 2,769,922 | 11/1956 | Peery | 250/234 |
| 3,401,937 | 9/1968 | Rockwood | 250/222 R |

Primary Examiner—S. Clement Swisher
Assistant Examiner—Denis E. Corr
Attorney, Agent, or Firm—John H. Lewis, Jr.; Nicholas Skovran

[57] ABSTRACT

A spot of light is projected onto an exposed target portion of a roll of opaque paper. A shotgun is aimed at the spot and fired from a predetermined distance so that the propelled shot particles produce a plurality of holes in the target. The aiming spot is eliminated and the target is back-lighted, illuminating the holes. An optical scanner scans the exposed paper, sensing the presence of a hole or portion thereof and assigning x,y coordinates thereto wherever light is observed. A computer utilizes this positional data to calculate a point of impact for the shot and the distance from the point of impact to the center of the aiming spot; it then determines the pattern density within a circle of predetermined radius around this center of impact. After scanning of the target has been completed, the roll of paper is indexed automatically to expose a previously unused section.

8 Claims, 3 Drawing Figures

METHOD AND APPARATUS FOR AUTOMATICALLY EVALUATING ACCURACY AND PATTERN DENSITY FOR A SHOTGUN

Testing of a shotgun requires the determination of two basic types of information. First, functional performance must be examined to ascertain whether the shotgun fires properly and exhibits all other operational characteristics required by its design specifications. The gun must also be examined to determine whether it has sufficient strength to withstand the pressures anticipated during firing as well as the forces produced by interactions between parts.

Second, shooting performance must be closely scrutinized to ensure that the shotgun will hit a target at which it is aimed and generally exhibit acceptable characteristics of accuracy and pattern density. With double barrel shotguns, the relative positions of the points of impact of the two barrels is also significant. The testing of shooting performance generally involves the examination of pellet patterns obtained at various distances.

The method generally utilized in the prior art for the determination of shooting performance consists of setting up a large sheet of paper having a bull's-eye marked at its center, aiming a shotgun at the bull's-eye and shooting from a predetermined distance, taking down the sheet of paper, visually approximating the location of a 30 in. diameter circle which will circumscribe the greatest number of holes, drawing the circle outline on the paper and designating the center of this circle as the center of impact for the shot. Next, the distance from the center of impact to the center of the bull's-eye is measured and checked against standard acceptable tolerances. The holes within the 30 in. circle are manually counted and a percent pattern is calculated (number of pellets in a 30 in. circle divided by the estimated number of pellets in the shell times 100 equals percent pattern).

It should be readily apparent that not only is such a system both tedious and time consuming but it is also highly unreliable, the center of impact being determined solely by an eyeball approximation.

In accordance with this invention, an automatic shot pattern recognition system scans the target, recognizes each hole and positions the hole in a two dimensional x-y coordinate system through the use of a digital computer. The computer calculates the center of impact, mathematically constructs a 30 in. circle around this center, counts the holes in this circle and calculates the percent pattern. These calculations may then be printed out on an input-output device such as a teletypewriter. The use of a computer for the determination of these values renders possible the further manipulation of input data so that many correlations can be obtained, for a single gun and for groups of guns of the same or different types.

It is an object of this invention to provide an apparatus and method for evaluating shotgun patterns by which accurate, reliable and reproducible results may be obtained in the minimum possible time.

It is another object of this invention to provide apparatus for the evaluation of shotgun patterns which will print out or store either data or calculated results as desired for present or future utilization.

It is an additional object of this invention to provide a method and apparatus for evaluating shotgun patterns by which eyeball approximations may be eliminated.

It is a further object of this invention to provide a method and apparatus for evaluating shotgun patterns wherein the measurement and evaluation functions are entirely automatic.

It is a still further object of this invention to provide a method and apparatus for evaluating shotgun patterns which requires only a single operator for effective and efficient operation.

These and other objects and advantages of this invention will be readily apparent when the following specification is read in connection with the appended drawings, wherein.

Figure 1:
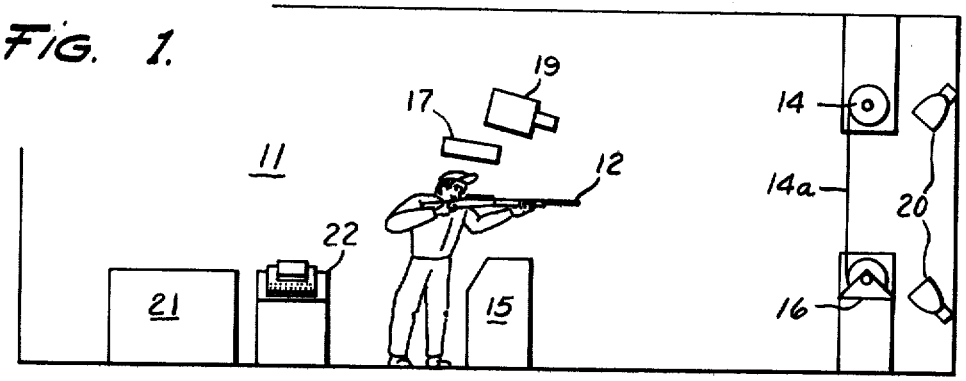
FIG. 1 is a generally diagrammatic view of a testing range equipped with the shotgun pattern evaluation apparatus of this invention.

Referring now to the drawings, FIG. 1 illustrates a testing range 11 wherein a shotgun 12 is evaluated by firing it at an exposed target portion 14a of a roll of paper 14 from a shooting station 15 located a predetermined distance from the paper 14. The shooting station 15 may be movable to permit the shotgun 12 to be fired from any desired distance from the target or exposed portion 14a. In the preferred embodiment, trap and field guns are fired at a distance of about 40 yds. and skeet guns, as well as all 410 gauge guns, at a distance of about 25 yds. from the target 14a.

When the shotgun 12 is fired, a large number of holes are placed in the target 14a so that, for evaluation purposes, each portion of the roll of paper 14 can be used for only one shot. Accordingly, a target paper roll drive mechanism 16 is provided and controlled in a manner to be subsequently described to roll up a quantity of paper about equal to the length of the exposed portion 14a before each firing of the shotgun 12.

To provide an accurately positioned and easily visible spot for the shotgun, the testing range 11 is maintained in a relatively darkened condition and a light source or bull's-eye illumination means 17, mounted in a fixed position in the testing range 11, is used to project a bull's-eye of prescribed dimensions, such as a circle of two inch radius, onto the target 14a. Because the plane of the exposed portion of the paper is fixed, as is the position of the light source 17, the aiming spot will always be in the same relative position on the target.

A scanning means, such as an optical scanner 19, is preferably mounted a fixed distance from the paper target 14a in a position permitting it to scan the entire target. Any convenient means (not shown) may be provided to protect the scanner 19 from damage which might be caused by stray shot particles. The optical scanner 19 may be an image dissector tube camera of a type well known to those skilled in the art, a suitable one being manufactured by Dicomed Corporation and sold with its associated digital electronics unit under the name of the Dicomed 50B Image Digitizer. Operation of the optical scanner 19 will be later described in detail.

To facilitate the counting of shot holes with the optical scanner 19, the bull's-eye illumination means 17 is darkened after each firing of the shotgun 12 and a plurality of backlights 20 are used to illuminate the rear of the target. During scanning operation, light intensities greater than a nominal ambient level will be visible to the scanner 19 only where the light from the backlights shines through the target 14a because the paper target has been punctured by a shot particle. It will be readily apparent that for optimum operation of this system, the target paper should preferably be optically opaque and be of a physical consistency which permits shot particles striking the paper to punch relatively uniform holes therein.

A computer 21 is provided to convert the assembled data from the scanner-digitizer into usable results which are printed out on a suitable input-output device, such as a teletypewriter 22, and to control the operation of the scanner 19 and related automatic equipment. The teletypewriter 22 may also be used by an operator for ultimate control of the system.

Figure 2:
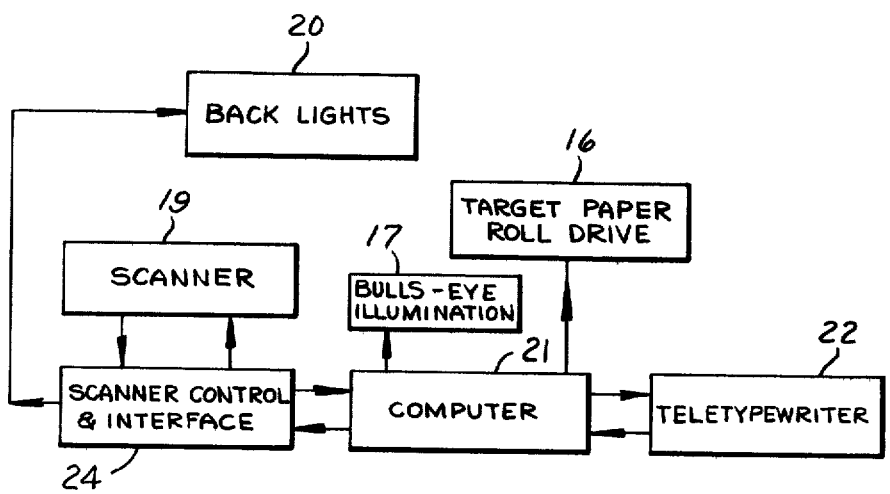
FIG. 2 is a block diagram illustrating functional relationships for the apparatus of FIG. 1.

The interrelationship of the system components is best shown in FIG. 2. It can be seen that principal control of the system components is maintained by the suitably programmed computer 21. The computer 21 is, in turn, controlled by the teletypewriter 22 and connected therewith to receive input information therefrom and transmit output information thereto in a well known manner.

The computer 21 is operatively connected to the scanner 19 and backlights 20 through a suitable scanner control and interface 24. In response to an appropriate command by the computer 21, the interface 24 backlights the target and initiates scanner operation. The interface 24 also serves to convert the output of the scanner 19 into information usable by the computer 21 detailing the $x,y$ coordinates of holes detected in the target by the scanner.

By other commands through additional control circuits, the computer 21 controls the presence or absence of the illuminated bull's-eye on the target by appropriate commands to the bull's-eye illumination means 17. Additionally, it causes the target paper roll drive 16 to index the roll of paper 14 by the proper amount when a new target surface is required.

With the shotgun pattern evaluation apparatus and method of this invention, a single operator can perform accurate and reliable tests of a large number of shotguns in a relatively short period of time. Working in the testing range 11 which, as previously indicated, is maintained at a low ambient light level, the operator, prior to firing, will preferably enter appropriate identification information into the computer 21, by use of the teletypewriter 22, so that the test shot or shots may later be statistically related to the gun from which they were fired. Appropriate input information might include the date, gun identification by model and serial number, an indication of whether the gun is new or repaired, gauge, number of barrels, choke designation for each barrel, length of barrel, number of pellets in the shotshell, and size of each pellet. Clearly some of this information may be deleted or other information added to suit the requirements of each particular testing program.

Upon receiving this information, the computer 21 preferably causes the bull's-eye illumination means 17 to illuminate an aiming spot on the surface of the exposed target portion 14a of the roll of paper 14. An appropriate size of target 14a may be about 40 in. and the center of the bull's-eye should preferably be at the center of the target.

The operator now carefully aims the shotgun 12 at the aiming point and fires the shotgun. This will produce a characteristic pattern of small holes in the paper. After firing the shotgun 12, the operator indicates to the computer 21 that the shotgun has been fired and the target 14a is ready for analysis. This may, if desired, be accomplished by pressing an appropriate button provided on the teletypewriter 22 for this purpose. Transmitting this information to the computer 21 begins the automatic scanning and evaluation process, entirely controlled by the computer.

The bull's-eye illumination means 17 is turned off so that the light produced by it will not interfere with the scanning process. The interface 24 then receives a command from the computer 21 to begin the scanning process.

This process generally comprises the steps of backlighting the target, scanning the target and causing the computer 21 to receive input indicative of the $x,y$ coordinates of each hole.

First, the backlights 20 are illuminated. This light system must be so disposed behind the target that it produces a relatively uniform illumination of the entire surface of the target so that holes of equal size positioned anywhere on the target will emit light of about the same intensity. Also, the lights must be positioned so that they will not be damaged by firing of the shotgun.

With the target illuminated by the backlights 20, the interface 24 causes the scanner 19 to go into operation. The scanner 19 may be located at any position which will enable it to accurately scan the entire surface of the target 14a and, in the preferred embodiment, may be a horizontal distance of 15 feet from the target and about 30 in. vertically above its center.

The scanner utilizes an image dissector tube that electronically scans the total target area. The field of view, which is preferably adjusted to consist solely of the target 14a, is effectively divided into a square array or matrix of small cells or sampling areas. Starting in the upper left-hand corner, the light intensity of each sampling area is sequentially measured. Each measurement is converted into a binary number ranging from dark or minimum brightness (0) to maximum brightness (64). In the preferred embodiment, the target 14a will be divided for scanning into 1,024 horizontal scanning lines, each comprising 1,024 scanning increments. In this manner, the target will be divided for analysis into more than one million sampling areas.

Figure 3:
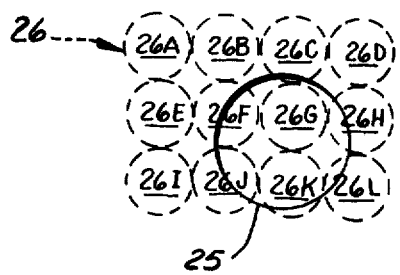
FIG. 3 is an illustrative diagram showing a preferred method for scanning a shot hole.

FIG. 3 displays a small segment of the target and illustrates how a shot hole 25 is detected by registration of the light level of a number of sampling areas 26. For the purposes of this example, 12 sampling areas 26A–L are illustrated. It can be seen that the sampling areas 26 are smaller than the shot hole 25 so that the light shining through the shot hole 25 will be recorded in more than one sampling area. At each sampling area 26, the light intensity is read by the scanner and translated, as previously indicated, into a binary number generally indicative of the average light intensity over the whole sampling area 26. Because the light intensity per unit area is generally uniform across each shot hole 25, the intensity reading can be interpreted as showing the relative amount of the sampling area which is illuminated and which, accordingly, falls within the shot hole. In FIG. 3, it can be seen that if the sampling areas for which greater than ambient light intensities will be recorded are ranked in order of increasing intensity, they are listed as 26C, 26L, 26H, 26J, 26F, 26K and 26G. The readings at sampling areas 26A, 26B, 26D, 26E and 26I should theoretically be equal to the ambient light level and to each other. However, there will normally be variances in the measured intensity levels due to noise. It is necessary, therefore, to define some minimum intensity measurement which will indicate a valid target hole "hit" and not noise. This is the designated threshold level and all readings less than this level are ignored.

This sub-threshold elimination can either be performed by an automatic threshold interface so that no readings below the threshold level are sent to the computer or it can be accomplished by the computer 21 itself so that the interface 24 sends all intensity levels to the computer but the computer ignores those which show a lower intensity than the threshold level.

With either scheme of sub-threshold elimination, a non-zero intensity level will only be recorded in the computer at coordinates where a sampling area indicated an intensity greater than the threshold level. For these sampling areas, the computer will record both the intensity level and the $x,y$ coordinates of the sampling area. Wherever a sufficient number of sampling areas 26 are found in a contiguous grouping, the computer will interpret this information as indicating the existence of a shot hole. For example, the readings recorded by the computer for the seven sampling areas in FIG. 3 would indicate the presence of a shot hole centered approximately on sampling area 26G. It should be apparent, however, that, due to the size of the shot hole 25, the presence of non-zero intensity readings in only four sampling areas would be sufficient to indicate the presence of a shot hole. Additionally, due to its size, the shot hole 25 could not cause non-zero intensity levels at more than eight sampling areas. This would not be true, however, for a much larger or smaller shot hole. Thus, both the minimum and maximum numbers of sampling areas which indicate the presence of a shot hole will vary with the size of the shot particles used. Accordingly, the designation of shot size in the pre-firing computer input can be used to adjust the computer program to change the upper and lower limits for the number of contiguous sampling areas having non-zero intensity levels which can be considered as indicating a single shot hole. The smallest shot hole effectively detectable by the scanner is one about the same size as one of the sampling areas 26, that is, with a diameter of about 0.040 in.

It is possible for two shot particles to strike the target 14$a$ so close together as to be overlapping. For example, in FIG. 3, in addition to the sampling areas 26 shown with positive intensity levels, sampling areas 26A, 26B and 26E might also exhibit non-zero intensity levels. In this case, because, for the shot size being used, a maximum of eight sampling areas can be covered by a single shot hole, the presence of ten contiguous sampling areas indicating non-zero light intensity must indicate the presence of two shot holes at this location. Accordingly, two shot holes, and their coordinates, are recorded.

During the scanning process, the scanner 19, through the interface 24, transmits the intensity and associated positional data to the computer 21. The computer, in turn, analyzes the intensities and, upon finding contiguous groupings showing non-zero light intensity levels, registers in its memory the $x,y$ coordinates of a shot hole. At the completion of this procedure, the location of each shot hole on the target 14$a$ will have been transmitted to and recorded by the computer 21 for any desired use.

When the interface 24 signals the computer 21 that the scanning procedure, generally requiring an elapsed time of about 25 seconds, has been completed, the backlights 20 and scanner 19 are turned off. At this point, the computer may command the target paper roll drive 16 to index the roll of paper 14 so that a fresh, hole-free portion will be exposed for the next shot. The previously used portion is no longer needed because it has been fully scanned and the coordinates of each hole recorded by the computer.

The computer 21 is now free to perform the desired calculations. For example, to determine the location of the center of impact relative to the bull's-eye, the center of the bull's-eye may be given the coordinates $x=0$, $y=0$ with the shot holes having $x$ and $y$ coordinates with either positive or negative notation as prescribed by standard coordinate system notation relative to the $x=0$, $y=0$ center lines. The point of impact can then be determined, in a manner well known to those skilled in the art, by taking the arithmetic mean of the $x$ and $y$ coordinates of all of the shot holes. It is then a simple matter to mathematically construct a circle of any desired radius and determine the number of shot holes falling within the circle using the equation $$(x-x_o)^2+(y-y_o)^2 \leq r^2$$

where $x$ and $y$ are the coordinates of each shot hole, $x_o$ and $y_o$ are the coordinates of the center of impact, and $r$ is the radius of the circle. Each shot hole having coordinates which satisfy the mathematical expression must be counted as being within the circle. Generally a 30 in. circle ($r=15$ in.) will be used but the percent pattern in smaller circles may also be of interest.

These values and other information may be compared with specifications for the particular gun and acceptance or rejection of the gun made entirely by the computer. If further shots are made with the same barrel or the same gun, these values may be averaged prior to evaluation. Also, any or all of this information may be printed out and/or stored for further use.

As is well known, these computations and the resultant print out on the teletypewriter 22 will occur in a very short duration so that, upon completion of the operation of the target paper roll drive 16 in moving a fresh portion of the roll of paper 14 to position to serve as target, the computer may activate the bull's-eye illumination means 17 to signal the operator that he may begin the cycle for the next shot.

In this manner, a method and apparatus is provided for automatically evaluating accuracy and pattern density for a shotgun which results in a significant saving of time and manpower and produces accurate and reproducible results without the necessity of eyeball approximations, hand counting and guesswork. If desired, certain changes and modifications can be made without departing from the spirit and scope of this invention. For example, instead of the image dissecting scanner 19, a raster-type scanner may be utilized in conjunction with an additional computer which converts the scanner's output into a set of hole coordinates which are then fed into the computer 21, thereby eliminating the need for the computer 21 to assimilate input indicating the positions of fractions of holes and convert this data to hole positions.

I claim:

1. A method of evaluating a shotgun, said method comprising the steps of aiming a shotgun at a predetermined aiming spot on an opaque target having a center point, firing the shotgun to produce a plurality of randomly distributed holes in the target, illuminating the target to cause light to pass through the holes in the target, and activating optical scanning means responsive to light passing through said holes for automatically scanning the target to generate two dimensional positional data locating each hole in the target.

2. The method of claim 1 including the additional step of causing a computer to utilize said generated positional data for calculating a center of impact and determining the position of the center of impact relative to said center point.

3. The method of claim 2 including the additional step of causing said computer to determine from said generated positional data the number of holes within a predetermined distance from said center of impact.

4. A method of using an optical scanner to evaluate a shotgun by obtaining pattern information from a plurality of randomly distributed holes produced by shot particles in an exposed target portion of a roll of opaque paper, said method comprising the steps of illuminating an aiming spot on the exposed target portion, aiming a shotgun at the aiming point, firing the shotgun to produce a plurality of randomly distributed holes in the target, terminating the illumination of the aiming spot, uniformly illuminating a surface of the exposed target portion to cause light to pass through the holes in the target, optically scanning the exposed target portion with means responsive to light passing through said holes to automatically generate two dimensional positional data for locating each hole, causing a computer to convert the positional data into pattern information, and changing the exposed portion of the roll of paper.

5. Apparatus for evaluating accuracy and pattern density for a shotgun when the shotgun is aimed at an aiming spot of a target and fired to propel projectiles for producing a plurality of holes in the target, said apparatus comprising a roll of target paper, means for exposing a portion of the paper from said roll to function as a target, and target paper rolling means for changing the portion of said target paper exposed as a target, said portion of said target paper being penetrable by said projectiles thereby producing therein a plurality of randomly distributed holes, scanning means for scanning the target and generating positional data for each hole in the target, and computer means operatively connected to the scanning means for receiving the positional data and calculating accuracy and pattern density information from the positional data wherein said target paper rolling means is operatively connected to said computer means for changing the exposed portion of said roll of paper in response to a command from said computer.

6. The apparatus of claim 5 wherein means are included for illuminating the aiming spot on said target and wherein said aiming spot illuminating means is operatively connected to said computer means for controlling selective illumination and darkening of said aiming spot.

7. Apparatus for evaluating accuracy and pattern density for a shotgun when the shotgun is aimed at an aiming spot of a target and fired to propel projectiles for producing a plurality of holes in the target, said apparatus comprising a target penetrable by projectiles for producing a plurality of randomly distributed holes, scanning means for scanning the target and generating positional data for each hole in the target, and computer means operatively connected to the scanning means for receiving the positional data and calculating accuracy and pattern density information from the positional data, including illuminating means for projecting light through a plurality of holes in said target wherein said illuminating means is operatively connected to said computer means to cause said projecting of light when said scanning means is scanning said target.

8. Apparatus for evaluating accuracy and pattern density for a shotgun when the shotgun is aimed at an aiming spot of a target and fired to propel projectiles for producing a plurality of holes in the target, said apparatus comprising an exposed target portion of a roll of paper, penetrable by projectiles for producing a plurality of holes, target paper rolling means for changing the exposed target portion, means for illuminating an aiming spot on the exposed target portion, illuminating means for projecting light through a plurality of holes in said target, scanning means for scanning and obtaining positional data for holes in the exposed target portion, and computer means for controlling the selective illumination and darkening of said aiming spot, controlling the selective illumination and darkening of said illuminating means, controlling activation of said scanning means, controlling operation of said target paper rolling means, and calculating accuracy and pattern density information from said positional data.

* * * * *